US012700411B2

(12) United States Patent
    Tang et al.

(10) Patent No.: US 12,700,411 B2
(45) Date of Patent: Aug. 4, 2026

(54) SYSTEMS AND METHODS FOR PROCESSING VOICE QUERIES OF DIFFERENT DURATION

(71) Applicant: Comcast Cable Communications, LLC, Philadelphia, PA (US)

(72) Inventors: Raphael Tang, Washington, DC (US); Karun Kumar, Hyattsville, MD (US); Geoffrey Craig Murray, Bethesda, MD (US); Ferhan Ture, Washington, DC (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 266 days.

(21) Appl. No.: 18/193,212

(22) Filed: Mar. 30, 2023

(65) Prior Publication Data

US 2024/0331703 A1     Oct. 3, 2024

(51) Int. Cl.
    *G10L 15/28*        (2013.01)
    *G10L 15/22*        (2006.01)
    *G10L 15/26*        (2006.01)
(52) U.S. Cl.
    CPC ............ *G10L 15/285* (2013.01); *G10L 15/22* (2013.01); *G10L 15/26* (2013.01); *G10L 15/28* (2013.01)
(58) Field of Classification Search
    CPC ...... G06F 9/505; G06F 9/5066; G06F 9/4881; G06F 16/90335; G06F 16/285; G10L 15/22; H04L 47/525; H04L 47/215; H04L 47/29
    See application file for complete search history.

(56) References Cited

U.S. PATENT DOCUMENTS

| | | | | |
|---|---|---|---|---|
| 8,380,502 B1 * | 2/2013 | Franz | ...................... | G10L 15/22 |
| | | | | 707/723 |
| 2016/0098292 A1 * | 4/2016 | Boutin | .................. | G06F 9/4881 |
| | | | | 718/104 |
| 2018/0075099 A1 * | 3/2018 | Park | ...................... | G06F 16/113 |
| | (Continued) | | | |

FOREIGN PATENT DOCUMENTS

| | | | | | |
|---|---|---|---|---|---|
| JP | 6530471 B2 * | 6/2019 | ............. | H04L 47/12 |

OTHER PUBLICATIONS

Chu, et al. "CUDA Kernel based Collective Reduction Operations on Large-scale GPU Clusters," 2016 16th IEEE/ACM International Symposium on Cluster, Cloud, and Grid Computing. (Year: 2016).*

(Continued)

*Primary Examiner* — Feng-Tzer Tzeng
(74) *Attorney, Agent, or Firm* — BakerHostetler

(57)     ABSTRACT

Methods and systems for improved data processing are disclosed. Data associated with a plurality of voice queries, having different length or time durations, may be received for processing. The plurality of voice queries may comprise a first voice query that has a first length. Based on the first length of the received data, a first processing function of a plurality of processing functions, and/or a server of a plurality of servers may be determined for further processing. The first processing function may be configured to process voice queries associated with the first length. The data associated with the first voice query may be sent for processing by the first processing function to determine text associated with the first voice query.

21 Claims, 10 Drawing Sheets

(56) References Cited

U.S. PATENT DOCUMENTS

2021/0224275 A1\*  7/2021  Maheshwari  ............ G06N 3/08
2022/0292021 A1\*  9/2022  Bitincka  ............. G06F 12/0866

OTHER PUBLICATIONS

Chu, et al., 2016 16th IEEE/ACM International Symposium on Cluster, Cloud, and Grid Computing—see attached reference in the previous Office action. (Year: 2016).\*
Chu, et al. "CUDA Kernel based Collective Reduction Operations on Large-scale GPU Clusters," 2016 16th IEEE/ACM International Symposium on Cluster, Cloud, and Grid Computing—see attached reference in the previous Office action. (Year: 2016).\*

\* cited by examiner

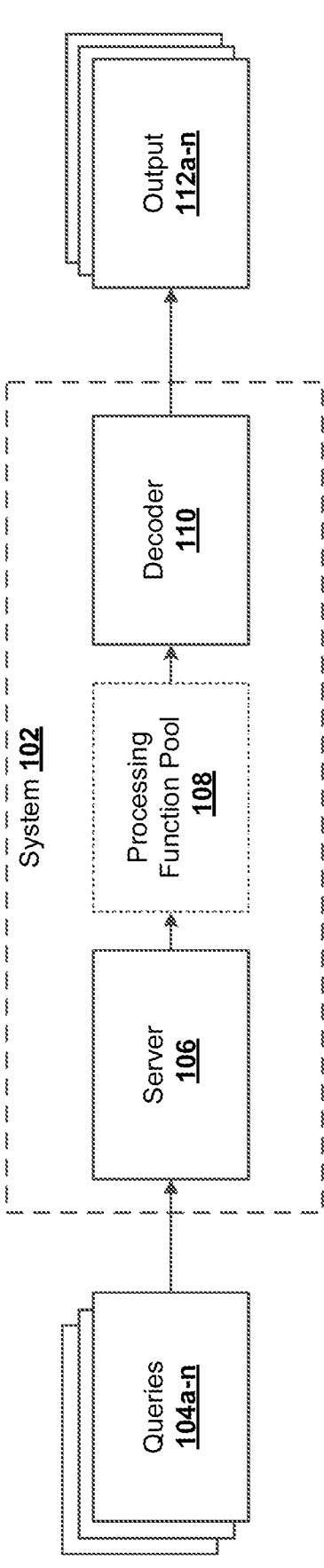
FIG. 1

Query 405c

Length 3

Query 405a

Length 1

Query 405b

Length 2

Server 401b

Processing Function Pool 201

Server 401n

Processing Function Pool 201

Server 401a

Processing Function Pool 201

400

Figure 5:
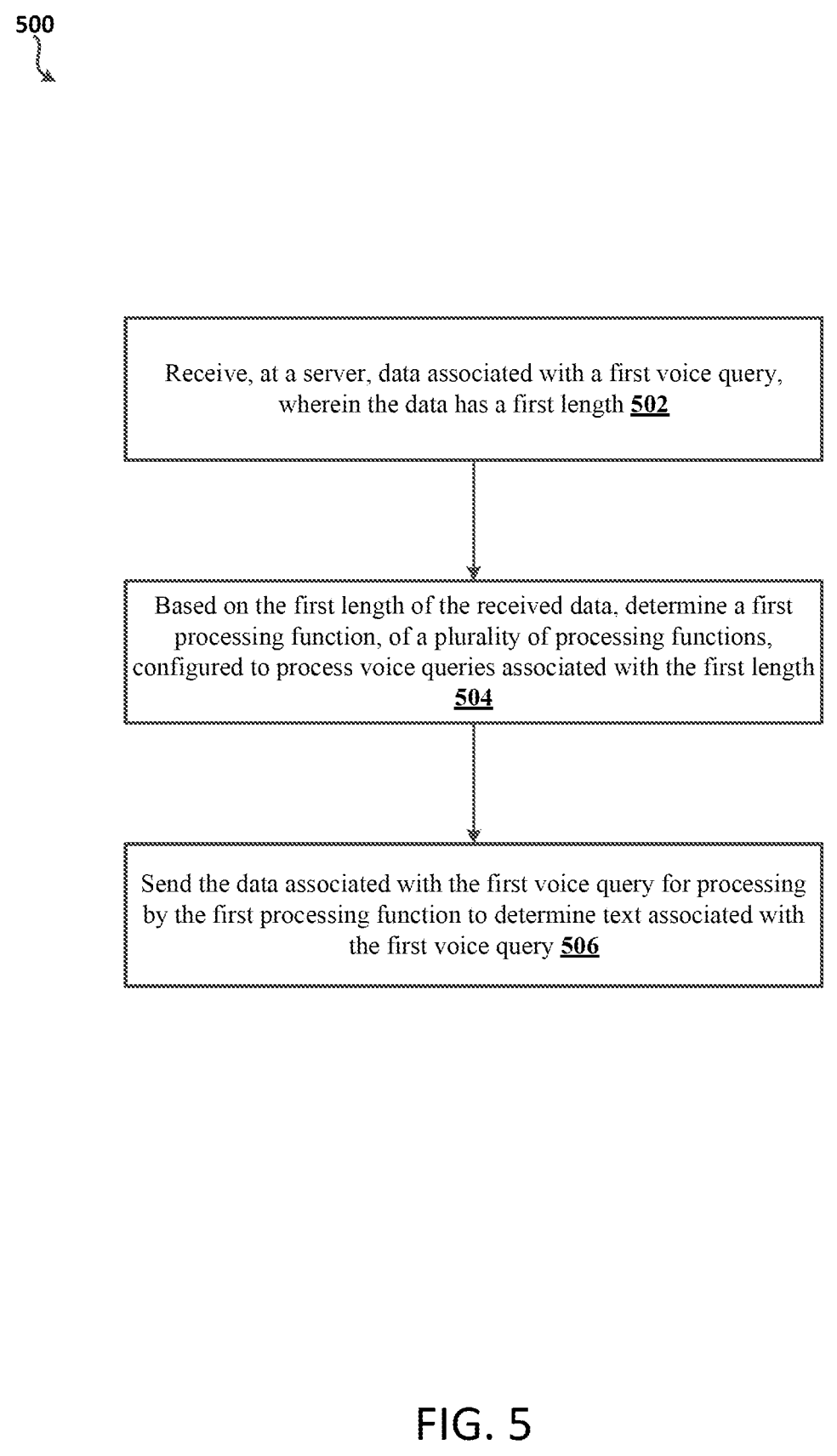

500

Receive, at a server, data associated with a first voice query, wherein the data has a first length 502

Based on the first length of the received data, determine a first processing function, of a plurality of processing functions, configured to process voice queries associated with the first length 504

Send the data associated with the first voice query for processing by the first processing function to determine text associated with the first voice query 506

Figure 6:
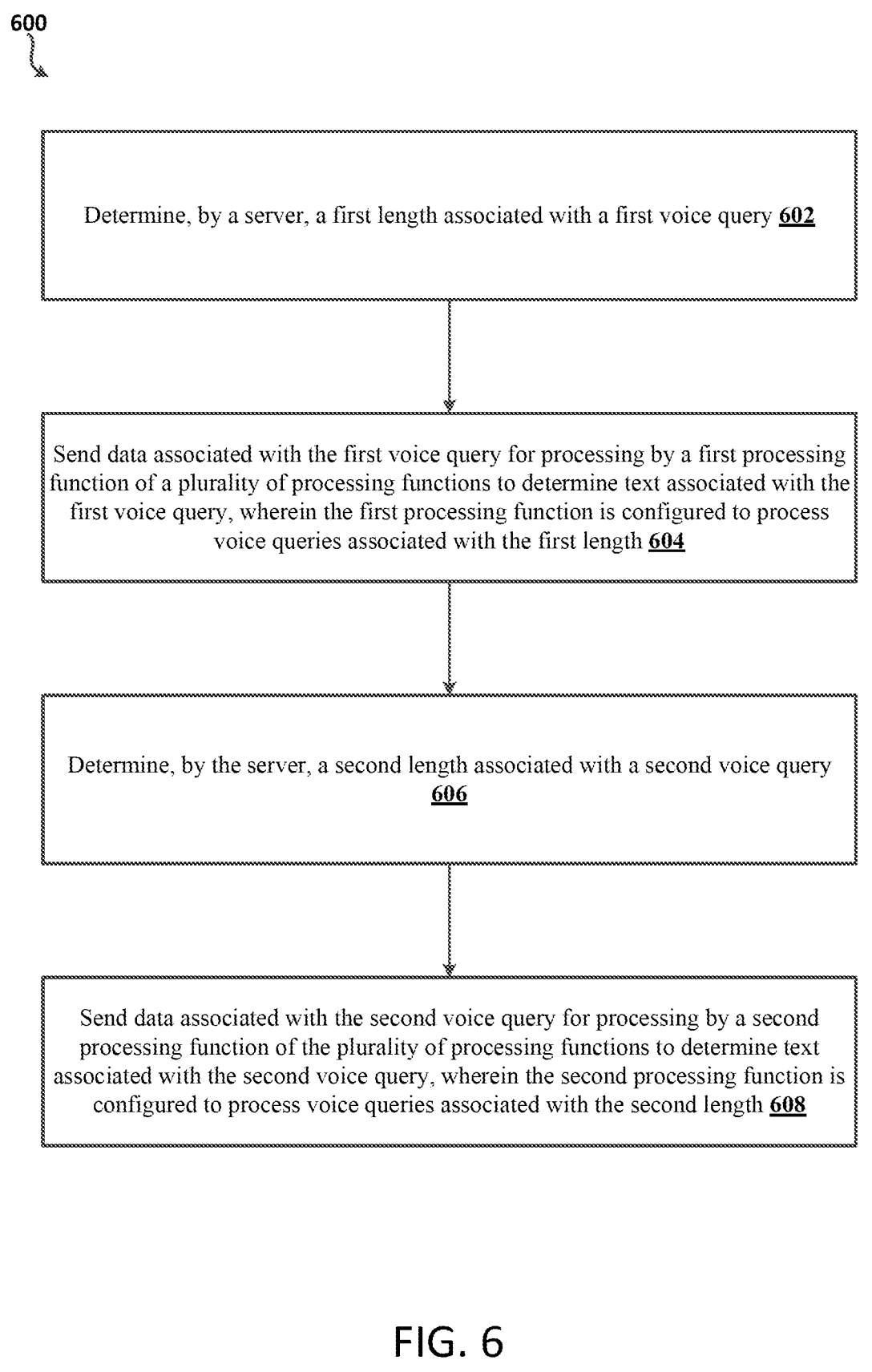

Determine, by a server, a first length associated with a first voice query __602__

Send data associated with the first voice query for processing by a first processing function of a plurality of processing functions to determine text associated with the first voice query, wherein the first processing function is configured to process voice queries associated with the first length __604__

Determine, by the server, a second length associated with a second voice query __606__

Send data associated with the second voice query for processing by a second processing function of the plurality of processing functions to determine text associated with the second voice query, wherein the second processing function is configured to process voice queries associated with the second length __608__

Figure 7:
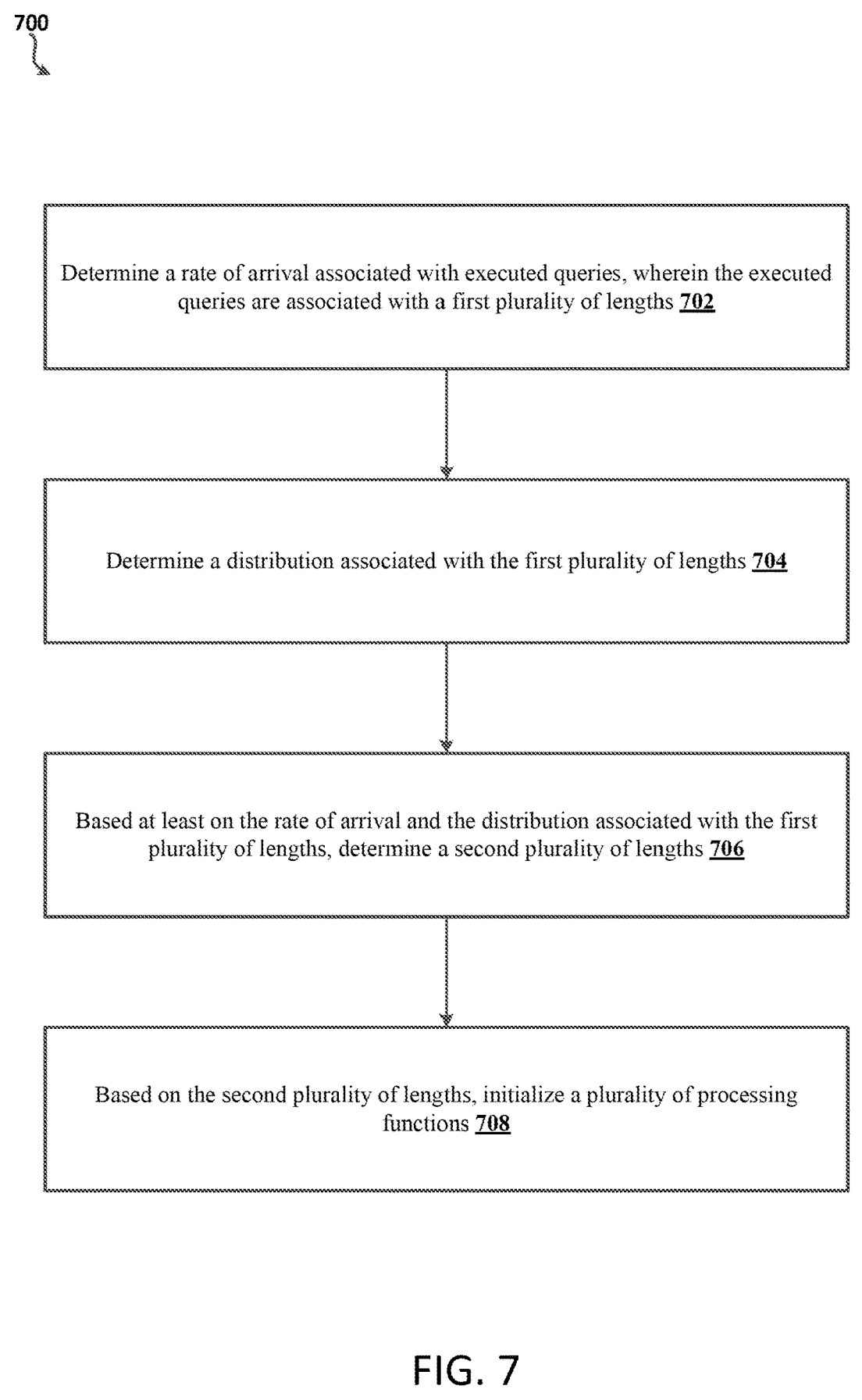

Determine a rate of arrival associated with executed queries, wherein the executed queries are associated with a first plurality of lengths 702

Determine a distribution associated with the first plurality of lengths 704

Based at least on the rate of arrival and the distribution associated with the first plurality of lengths, determine a second plurality of lengths 706

Based on the second plurality of lengths, initialize a plurality of processing functions 708

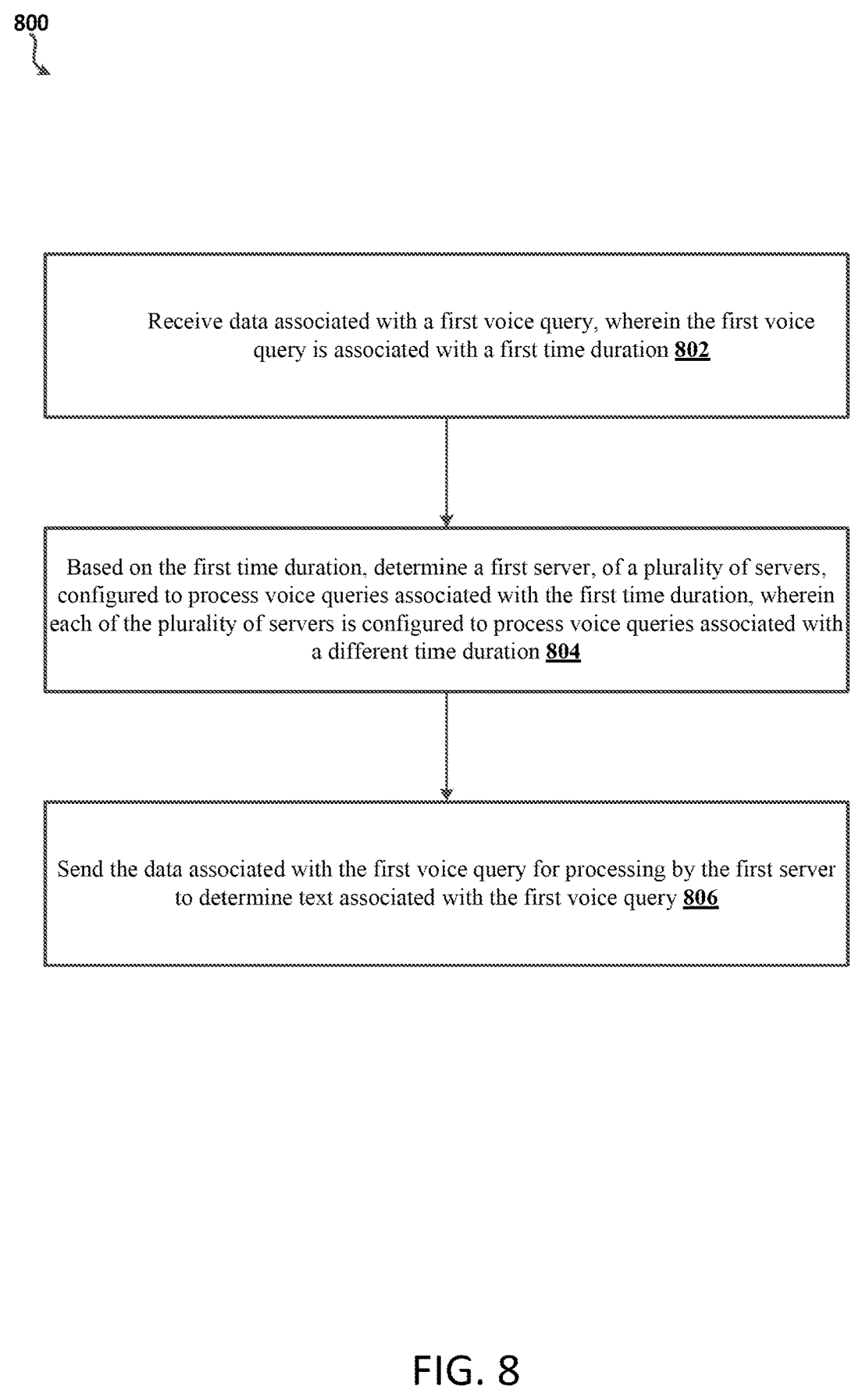

Receive data associated with a first voice query, wherein the first voice query is associated with a first time duration 802

Based on the first time duration, determine a first server, of a plurality of servers, configured to process voice queries associated with the first time duration, wherein each of the plurality of servers is configured to process voice queries associated with a different time duration 804

Send the data associated with the first voice query for processing by the first server to determine text associated with the first voice query 806

FIG. 8

SYSTEMS AND METHODS FOR PROCESSING VOICE QUERIES OF DIFFERENT DURATION

BACKGROUND

A variety of systems may be configured to process data. Such systems may comprise, for example, automatic speech recognition (ASR) systems, natural language understanding (NLU) systems, and/or machine translation systems. However, it may be difficult for such systems to efficiently process multiple queries with data having different lengths. Therefore, improved data processing techniques are desirable.

SUMMARY

Methods and systems for processing variable-length data are disclosed. A plurality of processing functions may be configured to process queries. Each of the plurality of processing functions may be configured to process queries of a particular length, or time duration. A query associated with a first length or time duration may be sent to a first processing function of the plurality of processing functions. The first processing function may be configured to process queries associated with the first length or time duration. A query associated with a second length or time duration may be sent to a second processing function of the plurality of processing functions. The second processing function may be configured to process queries associated with the second length or time duration.

A plurality of servers may be configured to process queries. Each of the plurality of servers may be configured to process queries of a particular length, or time duration. A query associated with a first length or time duration may be sent to a first server of the plurality of servers. The first server may be configured to process queries associated with the first length or time duration. A query associated with a second length or time duration may be sent to a second server of the plurality of servers. The second server may be configured to process queries associated with the second length or time duration.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

Additional advantages will be set forth in part in the description which follows or may be learned by practice. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate embodiments and together with the description, serve to explain the principles of the methods and systems.

FIG. 1 is an example system.

FIG. 5 is an example method.
FIG. 6 is an example method.
FIG. 7 is an example method.
FIG. 8 is an example method.

DETAILED DESCRIPTION OF ILLUSTRATIVE EMBODIMENTS

Figure 2:
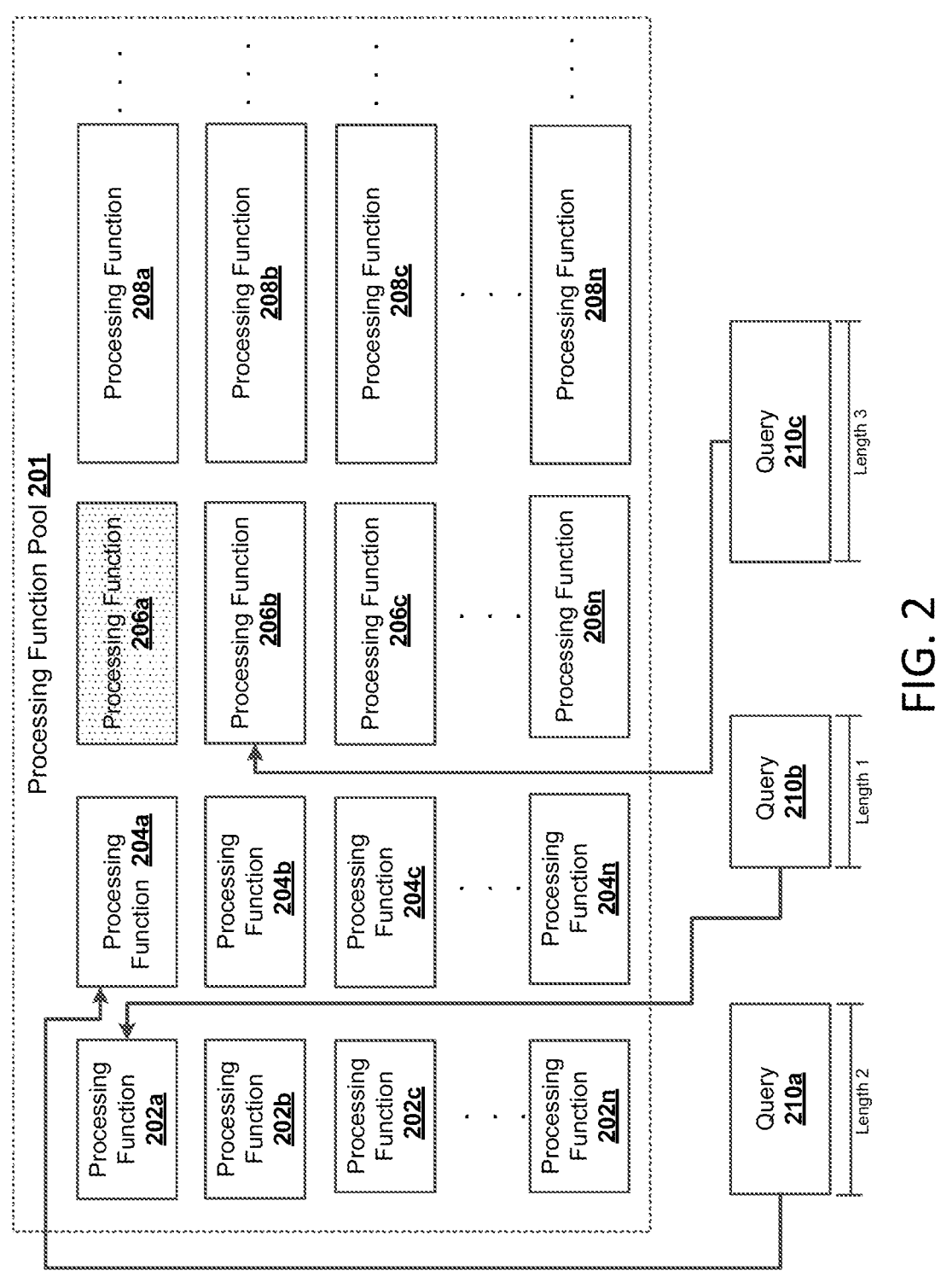
FIG. 2 is an example processing function pool.

Methods and systems for improved data processing are disclosed. An example data processing system may be configured to process queries. The queries may comprise, for example, a voice query, a voice command, an audio command, an audio query, a text query, a text command, and/or the like. The data processing system may be configured to receive the queries from one or more users. The data processing system may be configured to process the queries to generate output. For example, the data processing system may be configured to process audio queries to generate text output.

The data processing system may comprise a plurality of processing functions (e.g., processing modules, computational models, etc.). The plurality of processing functions may be configured to process the received queries. Each the plurality of processing functions may be configured to process data of a particular length (e.g., size) or time duration. For example, each the plurality of processing functions may be instantiated, warmed up, and persisted to process data of a given length or time duration. Thus, each the plurality of processing functions may require data input of a fixed length or time duration. However, this may impede the data processing system's ability to perform tasks such as automatic speech recognition (ASR), natural language understanding (NLU), and machine translation, as such tasks involve variable-length data inputs. Some data processing systems may pad (e.g., increase the size of) at least a portion of the variable-length data inputs so that all of the data inputs are of the same size. However, simply padding all data inputs to a long, fixed size is inefficient, as machine learning models may have hundreds of millions to billions of parameters and quadratic time complexity. Thus, improved techniques for processing variable-length data are needed.

Described herein are improved techniques for processing variable-length data. A plurality (e.g., pool) of processing functions may be pre-prepared (e.g., initialized). The plurality of processing functions may be initialized to process data of a plurality of lengths or time duration. For example, each of the plurality of processing functions may be initialized to process data of a particular length of the plurality of lengths or a particular time duration of the plurality of time durations. Data associated with received queries may be sent (e.g., routed) to a particular processing function of the plurality of processing functions based on the length or time duration of the data. For example, if first data associated with a first received query has a first length or time duration, the first data may be sent to a first processing function of the plurality of processing functions. The first processing function of the plurality of processing functions may be initialized to process data of the first length or time duration. If second data associated with a second received query has a second length or time duration, the second data may be sent to a second processing function of the plurality of processing functions. The second processing function of the plurality of processing functions may be initialized to process data of the first length or time duration.

FIG. 1 shows a block diagram of an example system 100. The system 100 may comprise a data processing system 102. The data processing system 102 may comprise at least one server device 106, a processing function pool 108, and a decoder device 110. It should be noted that while the singular term device is used herein, it is contemplated that some devices may be implemented as a single device or a plurality of devices (e.g., via load balancing). The server device 102, the processing function pool 108, and the decoder device 110 may each be implemented as one or more computing devices. Any device disclosed herein may be implemented using one or more computing nodes, such as virtual machines, executed on a single device and/or multiple devices.

The data processing system 102 may, for example, comprise one or more of an automatic speech recognition (ASR) system, a natural language understanding (NLU) system, or a machine translation system. The data processing system 102 may be configured to process queries 104*a-n*. The queries 104*a-n* may comprise, for example, one or more of a voice query (e.g., voice command, audio command, audio query, etc.), a text query (e.g., text command), and/or a combination thereof. The data processing system 102 may be configured to receive the queries 104*a-n* from one or more users.

The data processing system 102 may be configured to process the queries 104*a-n* to generate output 112*a-n*. For example, the data processing system 102 may be configured to process the query 104*a* to generate output 112*a* associated with the query 104*a*, process the query 104*b* to generate output 112*b* associated with the query 104*b*, and so on. The output 112*a-n* may comprise text output, audio output, and/or a combination thereof. If the queries 104*a-n* comprise voice queries, the data processing system 102 may be configured to process the queries 104*a-n* to generate text output or audio output. If the queries 104*a-n* comprise text queries, the data processing system 102 may be configured to process the queries 104*a-n* to generate text output or audio output.

The queries 104*a-n* may be associated with a plurality of different query lengths or time durations. For example, at least one of the queries 104*a-n* may be associated with data having a different length or time duration than the remainder of the queries 104*a-n*. The query 104*a* may be associated with first data having a first length or time duration, the query 104*b* may be associated with second data having a second length or time duration, the query 104*c* may be associated with third data having a third length or time duration, and so on. The first length or time duration may be greater than the second length or time duration. For example, the query 104*a* may comprise the query "What is the temperature like on Friday in Seattle?" and the query 104*b* may comprise the query "Seattle weather." The third length or time duration may be greater than the second length or time duration and smaller than the first length or time duration. For example, the query 104*c* may comprise the query "Seattle temperature on Friday." It is not necessary that all of the queries 104*a-n* be associated with a different length or time duration. Two or more of the queries 104*a-n* may be associated with data having the same length or time duration. For example, both the query 104*a* and the query 104*d* may be associated with data having the first length or time duration.

The processing function pool 108 may comprise a plurality of processing functions. The plurality of processing functions may be pre-prepared (e.g., initialized). The plurality of processing functions may be initialized to process data of a plurality of input lengths or time durations. For example, each of the plurality of processing functions may be initialized to process data of a particular length of the plurality of input lengths. Each of the plurality of processing functions may comprise, for example, a compute unified device architecture (CUDA) graph. A CUDA graph may comprise a plurality of kernels (e.g., graphics processing unit (GPU) kernels, subroutines, etc.) that are linked together. The plurality of GPU kernels may be launched once as a whole graph of operations, instead of being launched individually (e.g., one at a time). Initializing each of the plurality of processing functions may comprise recording a sequence of kernels associated with processing an unexecuted query associated with a particular length of the plurality of input lengths or a particular time duration of the plurality of time durations.

The plurality of inputs lengths or time durations may be determined based on previously executed queries (e.g., queries already executed by the data processing system 102). The previously executed queries may be associated with a distribution of lengths or time durations. For example, the distribution of lengths or time durations may indicate the length or time duration associated with each of the previously executed queries. The distribution of lengths or time durations may indicate the relative frequency (e.g., probability of how often they occur) of each of the lengths or time durations associated with the previously executed queries. The previously executed queries may be associated with a rate of arrival. For example, the rate of arrival may indicate a rate at which the previously executed queries arrived at the data processing system 102.

The plurality of input lengths or time durations may be determined based at least on the rate of arrival. Additionally, or alternatively, the plurality of input lengths or time durations may be determined based at least on the distribution of lengths or time durations. For example, if the distribution of lengths indicates that none of the previously executed queries are associated with a particular length or time duration, the determined plurality of input lengths or time durations may not comprise that particular length or time duration. If the distribution of lengths indicates that at least one of the previously executed queries are associated with a particular length or time duration, the determined plurality of input lengths or time durations may comprise that particular length or time duration. If the rate of arrival indicates that the previously executed queries associated with a particular length or time duration arrived at the data processing system 102 slowly (e.g., at a low rate), the determined plurality of input lengths or time durations may not comprise that particular length. If the rate of arrival indicates that the previously executed queries associated with a particular length or time duration arrived at the data processing system 102 rapidly (e.g., at a high rate), the determined plurality of input lengths or time durations may comprise that particular length or time duration.

The plurality of processing functions may be initialized based on the determined plurality of input lengths or time durations. Each length of the determined plurality of input lengths or time durations may correspond to at least one processing function of the plurality of processing functions. For example, if the determined plurality of input lengths comprises a particular length or time duration, at least one processing function of the plurality of processing functions may be initialized to process data of that particular length or time duration. More than one processing function of the plurality of processing functions may be initialized to process data of the same length or time duration. For example, if the distribution of lengths indicated that a large percentage of the previously executed queries are associated with a particular length or time duration, a larger quantity of processing functions may be initialized to process data of that particular length or time duration. Conversely, if the distribution of lengths indicated that a small percentage of the previously executed queries are associated with a particular length or time duration, a smaller quantity (e.g., one, two, etc.) of the plurality of processing functions may be initialized to process data of that particular length or time duration. If the rate of arrival indicates that the previously executed queries associated with a particular length or time duration arrived at the data processing system 102 rapidly, a larger quantity of processing functions may be initialized to process data of that particular length or time duration. Conversely, if the rate of arrival indicates that the previously executed queries associated with a particular length or time duration arrived at the data processing system 102 slowly, a smaller quantity (e.g., one, two, etc.) of processing functions may be initialized to process data of that particular length or time duration.

Initializing the plurality of processing functions may comprise causing the plurality of processing functions to run on one or more servers. The entire plurality of processing functions may be initialized on one or more servers. For example, the entire plurality of processing functions may be initialized on a first server, and the entire plurality of processing functions may be initialized on a second server, and so on. Additionally, or alternatively, a subset of the plurality of processing functions may be initialized on one server and another subset of the plurality of processing functions may be initialized on another server, and so on. Additionally, or alternatively, each of the plurality of processing functions may be initialized on a different server. For example, a first processing function of the plurality of processing functions may be initialized on a first server, a second processing function of the plurality of processing functions may be initialized on a second server, and so on.

To process the queries 104a-n, the data processing system 102 may receive the queries 104a-n. The data processing system 102 may receive the queries 104a-n at the server device 106. The server device 106 may be configured to determine a length or time duration associated with each of the queries 104a-n. For example, the server device 106 may be configured to determine a length or time duration of the data associated with each of the queries 104a-n. As described above, the queries 104a-n may be associated with a plurality of different lengths or time durations. For example, the query 104a may be associated with first data having a first length or time duration, the query 104b may be associated with second data having a second length or time duration, the query 104c may be associated with third data having a third length or time duration, and so on.

The data processing system 102, such as the server device 106, may be configured to determine a processing function of the plurality of processing functions that corresponds to each of the queries 104a-n. The data processing system 102 may be configured to determine a processing function of the plurality of processing functions that corresponds to each of the queries 104a-n based on the length or time duration of the data associated with each of the queries 104a-n. For example, if the query 104a is associated with first data having a first length or time duration, the data processing system 102 may determine that a first processing function of the plurality of processing functions corresponds to the query 104a. The first processing function may be configured to process data having the first length or time duration. If the query 104b is associated with second data having a second length or time duration, the data processing system 102 may determine that a second processing function of the plurality of processing functions corresponds to the query 104b. The second processing function may be configured to process data having the second length or time duration.

The data processing system 102 (e.g., the server device 106) may be configured to determine if the corresponding processing function of the plurality of processing functions is available. For example, if it is determined that the first processing function of the plurality of processing functions corresponds to the query 104a, the data processing system 102 may determine if the first processing function is available to process data associated with the query 104a. The first processing function may be available to process data associated with the query 104a if the first processing function is currently idle (e.g., not processing data). The first processing function may not be available to process data associated with the query 104a if the first processing function is currently active (e.g., processing other data).

The data processing system 102 (e.g., the server device 106) may be configured to send the data associated with each of the queries 104a-n to the corresponding processing function of the plurality of processing functions. For example, if the query 104a corresponds to a first processing function of the plurality of processing functions, the data processing system 102 may send the data associated with the query 104a to the first processing function. The data processing system 102 may send the data associated with the query 104a to the first processing function based on determining that the first processing function is available. If the query 104b corresponds to a second processing function of the plurality of processing functions, the data processing system 102 may send the data associated with the query 104b to the second processing function. The data processing system 102 (e.g., the server device 106) may send the data associated with the query 104b to the second processing function based on determining that the second processing function is available. Each of the corresponding processing functions may receive the data associated with a query. The corresponding processing functions may process the received data to generate encoded output. The encoded output may be decoded by the decoder device 110 to generate the output 112a-n.

As described above, two or more of the queries 104a-n may be associated with data having the same length or time duration. For example, both the query 104a and the query 104d may be associated with data having the first length or time duration. Thus, if the data processing system 102 (e.g., the server device 106) has already sent the data associated with the query 104a to the first processing function, the first processing function may be unavailable to process the data associated with the query 104d. If the data processing system 102 (e.g., the server device 106) determines that the first processing function is unavailable to process the data associated with the query 104d, the data processing system 102 (e.g., the server device 106) may determine a different processing function of the plurality of processing functions. The different processing function may be configured to process queries of the first length or time duration. The data processing system 102 (e.g., the server device 106) may send the data associated with the query 104d to the different processing function. For example, the data processing system 102 may send the data associated with the query 104d to the different processing function based on determining that the different processing function is available.

One or more of the queries 104a-n may be associated with data having a length or time duration (e.g., an unmatched length or time duration) that does not correspond to a particular processing function of the plurality of processing functions. If a query is associated with data having an unmatched length or time duration, the data processing system 102 (e.g., the server device 106) may determine a processing function of the plurality of processing functions that most closely corresponds to the unmatched length or time duration. For example, the most closely corresponding processing function may be a processing function that is configured to process queries associated with a most closely corresponding length or time duration. The most closely corresponding length or time duration may be a length or time duration that is larger than the unmatched length or time duration. The most closely corresponding length or time duration may be the length or time duration that is closest in value to the unmatched length or time duration. The data processing system 102 (e.g., the server device 106) may be configured to adjust (e.g., modify, increase, adjust, pad) the data having the unmatched length or time duration so that the new length or time duration of the data is the most closely corresponding length or time duration. The data processing system 102 (e.g., the server device 106) may be configured to send the data to the most closely corresponding processing function for processing.

For example, the query 104c may be associated with third data having a third length or time duration. The determined plurality of input lengths or time durations used to initialize the plurality of processing functions may not comprise the third length or time duration. Thus, there may not be a processing function of the plurality of processing functions that is configured to process queries of the third length or time duration. The third length or time duration may be an unmatched length or time duration. The data processing system 102 (e.g., the server device 106) may determine a processing function of the plurality of processing functions that most closely corresponds to the third length or time duration. For example, the most closely corresponding processing function may be a processing function that is configured to process queries associated with a fourth length or time duration. The fourth length or time duration may be a length or time duration of the plurality of input lengths or time durations that is larger than the third length or time duration. The fourth length or time duration may be the length or time duration of the plurality of input lengths or time durations that is closest in value to the third length or time duration. The data processing system 102 may be configured to adjust (e.g., modify, increase, adjust, pad) the third data so that the third data has the fourth length or time duration. The data processing system 102 (e.g., the server device 106) may be configured to send the third data having the fourth length or time duration to the processing function that is configured to process queries associated with the fourth length or time duration.

The processing function pool 108 may be configured to generate encoded output. For example, each of the plurality of processing functions may be configured to process data and generate encoded output. The encoded output associated with each of the queries 104a-n may be sent to the decoder device 110. For example, the processing function pool 108 may send the encoded output associated with each of the queries 104a-n to the decoder device 110. The decoder device 110 may be configured to decode the encoded output to generate the output 112a-n. For example, the decoder device 110 may be configured to decode the encoded output associated with query 104a to generate the output 112a, decode the encoded output associated with query 104b to generate the output 112b, and so on. If the queries 104a-n comprise voice queries, the output 112a-n may comprise text output or audio output. If the queries 104a-n comprise text queries, the output 112a-n may comprise text output or audio output.

FIG. 2 is an example processing function pool 201. The processing function pool 201 may comprise, for example, the processing function pool 108 of FIG. 1. The processing function pool 201 may comprise a plurality of processing functions. The plurality of processing functions may be running on one or more servers. Each of the processing functions may comprise, for example, a CUDA graph.

The plurality of processing functions may comprise a plurality of subsets of processing functions. Each subset of the plurality of subsets of processing functions may comprise processing functions configured to process queries associated with a particular length.

The plurality of subsets of processing functions may comprise, for example, a first subset of processing functions 202a-n, a second subset of processing functions 204a-n, a third subset of processing functions 206a-n, a fourth subset of processing functions 208a-n, and so on. The plurality of subsets may comprise any quantity of subsets. Each subset of the plurality of subsets may comprise any quantity of processing functions. One or more subsets of the plurality of subsets may comprise a different quantity of processing functions than the other subsets.

The first subset of processing functions 202a-n may comprise a first plurality of processing functions configured to process data of a first length. For example, the first subset of processing functions 202a-n may comprise a first plurality of processing functions initialized to process data having a length "Length 1." The second subset of processing functions 204a-n may comprise a second plurality of processing functions configured to process data of a second length. For example, the second subset of processing functions 204a-n may comprise a second plurality of processing functions initialized to process data having a length "Length 2." The third subset of processing functions 206a-n may comprise a third plurality of processing functions configured to process data of a third length. For example, the third subset of processing functions 206a-n may comprise a third plurality of processing functions initialized to process data having a length "Length 3."

Each of the queries 210a-c may be sent to a processing function in the processing function pool 201 for processing. Each of the queries 210a-c may be sent to a processing function in the processing function pool 201 based on a length associated with the queries 210a-c. The query 210b may be associated with a length of "Length 1." As the first subset of processing functions 202a-n comprises a first plurality of processing functions initialized to process data having a length "Length 1," the query 210b may be sent to a processing function of the first plurality of processing functions. For example, the query 210b may be sent to the processing function 202a based on a determination that the processing function 202a is available (e.g., not currently processing a different query).

The query 210a may be associated with a length of "Length 2." As the second subset of processing functions 204a-n comprises a second plurality of processing functions initialized to process data having a length "Length 2," the query 210a may be sent to a processing function of the second plurality of processing functions. For example, the query 210a may be sent to the processing function 204a based on a determination that the processing function 204a is available (e.g., not currently processing a different query).

The query 210c may be associated with a length of "Length 3." As the third subset of processing functions 206a-n comprises a third plurality of processing functions initialized to process data having a length equal to "Length 3," the query 210c may be sent to a processing function of the third plurality of processing functions. For example, the query 210c may be sent to the processing function 206b based on a determination that the processing function 206a is unavailable (e.g., currently processing a different query). The query 210c may be sent to the processing function 206b based on a determination that the processing function 206b is available.

Figure 3:
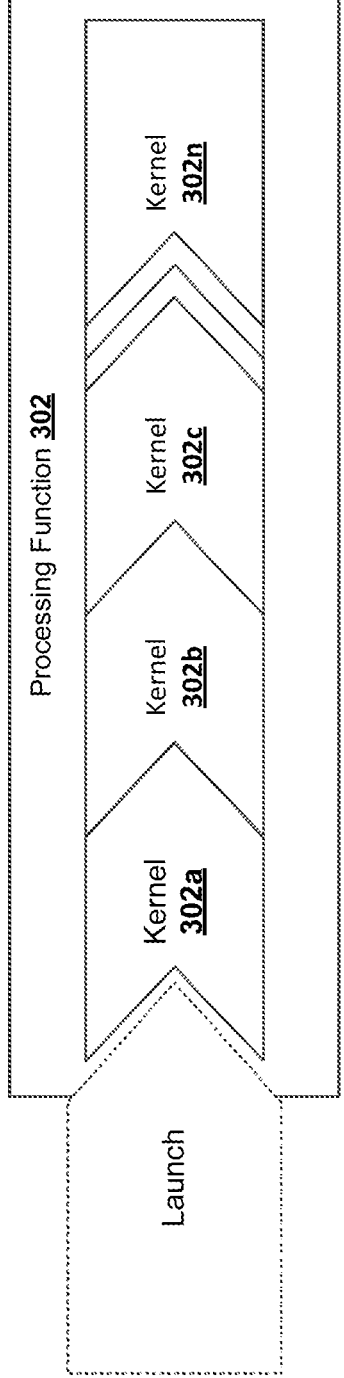
FIG. 3 is an example processing function.

FIG. 3 is an example processing function 302. The processing function 302 may comprise, for example, any of the processing functions referred to with regard to FIG. 1 or FIG. 2. The processing function 302 may comprise a CUDA graph. The processing function 302 may comprise a plurality of kernels 302a-n. The plurality of kernels 302a-n may be, for example, CPU kernels or subroutines. The plurality of kernels 302a-n may be linked together. The plurality of kernels 302a-n may comprise a sequence of kernels associated with processing an unexecuted query associated with a particular length. The processing function 302 may be launched. If the processing function 302 is launched, the plurality of kernels 302a-n may be launched as a graph of operations. Thus, the plurality of kernels 302a-n may not need to be individually launched. If the plurality of kernels 302a-n do not need to be individually launched, the query may be processed in a more efficient manner.

Figure 4A:
FIG. 4A is an example system.

FIG. 4A is an example system 400. As described above, the entire plurality of processing functions (e.g., the processing function pool 201 and/or the processing function pool 108) may be initialized on one or more servers. For example, the entire plurality of processing functions may be initialized on a first server, and the entire plurality of processing functions may be initialized on a second server, and so on. As shown by the example system 400, the entire processing function pool 201 may be initialized on each of a plurality of servers 401a-n. For example, the entire processing function pool 201 may be initialized on the server 401a, the entire processing function pool 201 may be initialized on the server 401b, and so on.

Thus, each of the plurality of servers 401a-n may be configured to process queries of different lengths or time durations. For example, the data associated with a query 405a may have a first length. Any of the plurality of servers 401a-n may be configured to process queries of the first length. For example, at least one processing function initialized to process data having the first length may be executing on each of the plurality of servers 401a-n. If any of the plurality of servers 401a-n are configured to process queries of the first length, the query 405a may be sent to any of the plurality of servers 401a-n, such as to the server 401a for processing. The data associated with a query 405b may have a second length. Any of the plurality of servers 401a-n may be configured to process queries of the second length. For example, at least one processing function initialized to process data having the second length may be executing on each of the plurality of servers 401a-n. If any of the plurality of servers 401a-n are configured to process queries of the second length, the query 405b may be sent to any of the plurality of servers 401a-n, such as to the server 401b for processing. The data associated with a query 405c may have a third length. Any of the plurality of servers 401a-n may be configured to process queries of the third length. For example, at least one processing function initialized to process data having the third length may be executing on each of the plurality of servers 401a-n. If any of the plurality of servers 401a-n are configured to process queries of the third length, the query 405a may be sent to any of the plurality of servers 401a-n, such as to the server 401n for processing.

Figure 4B:
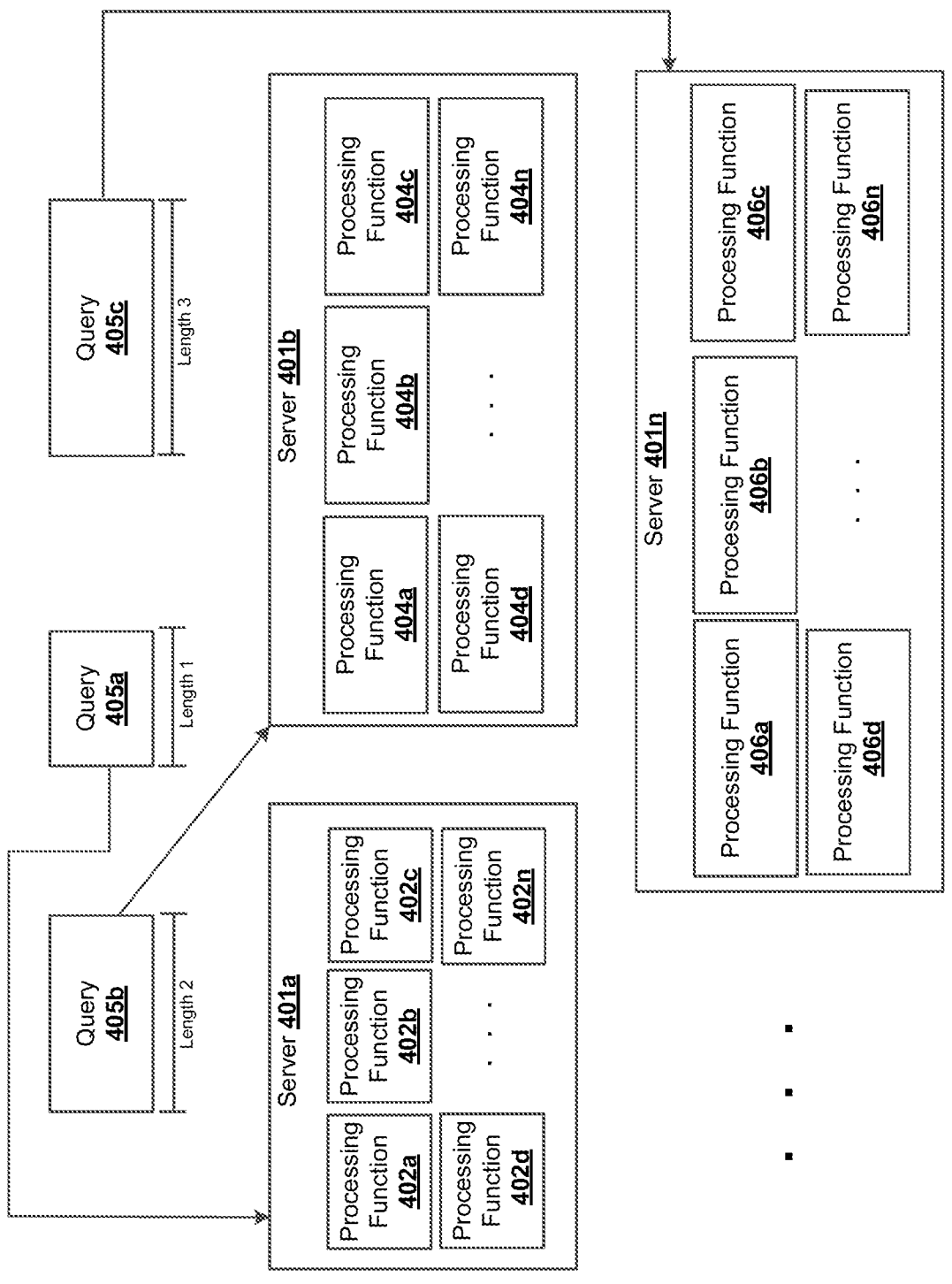
FIG. 4B is an example system.

FIG. 4B is an example system 403. As described above, a subset of the plurality of processing functions may be initialized on one server and another subset of the plurality of processing functions may be initialized on another server, and so on. Additionally, or alternatively, each of the plurality of processing functions may be initialized on a different server. For example, a first processing function of the plurality of processing functions may be initialized on a first server, a second processing function of the plurality of processing functions may be initialized on a second server, and so on.

A first subset 402a-n of processing functions may be initialized on a first server 401a of a plurality of servers 401a-n. The first subset of processing functions 402a-n may comprise one or more processing functions configured to process data of a first length or time duration. For example, the first subset of processing functions 402a-n may be initialized to process data having a length "Length 1." The query 405a, which may be associated with the first length or time duration, may be sent to the first server 401a for processing. Any of the first subset of processing functions 402a-n initialized on the first server 401a may be configured to process the query 405a. The first query 405a may be processed, for example, by the processing function 402a. The first query 405a may be processed by the processing function 402a if the processing function 402a currently idle (e.g., not processing data). The processing function 402a may not be available to process data associated with the query 405a if the processing function 402a is currently active (e.g., processing other data). If the processing function 402a is currently active, the query 405a may instead be processed by another processing function of the first subset of processing functions 402a-n, such as by processing function 402b.

A second subset 404a-n of processing functions may be initialized on a second server 401b of the plurality of servers 401a-n. The second subset of processing functions 404a-n may comprise one or more processing functions configured to process data of a second length or time duration. For example, the second subset of processing functions 404a-n may be initialized to process data having a length "Length 2." The query 405b, which may be associated with the second length or time duration, may be sent to the second server 401b for processing. Any of the second subset of processing functions 404a-n initialized on the second server 401b may be configured to process the query 405b. The query 405b may be processed, for example, by the processing function 404a. The query 405b may be processed by the processing function 404a if the processing function 404a currently idle (e.g., not processing data). The processing function 404a may not be available to process data associated with the query 405b if the processing function 404a is currently active (e.g., processing other data). If the processing function 404a is currently active, the query 405b may instead be processed by another processing function of the second subset of processing functions 404a-n, such as by processing function 404b.

A third subset 406a-n of processing functions may be initialized on a third server 401n of the plurality of servers 401a-n. The third subset of processing functions 406a-n may comprise one or more processing functions configured to process data of a third length or time duration. For example, the third subset of processing functions 406a-n may be initialized to process data having a length "Length 3." The query 405c, which may be associated with the third length or time duration, may be sent to the third server 401n for processing. Any of the third subset of processing functions 406a-n initialized on the third server 401n may be configured to process the query 405c. The query 405c may be processed, for example, by the processing function 406a. The query 405c may be processed by the processing function 406a if the processing function 406a currently idle (e.g., not processing data). The processing function 406a may not be available to process data associated with the query 405c if the processing function 406a is currently active (e.g., processing other data). If the processing function 406a is currently active, the query 405c may instead be processed by another processing function of the second subset of processing functions 404a-n, such as by processing function 406b.

FIG. 5 is an example method 500. The method 500 may comprise a computer implemented method for improving data processing. A system and/or computing environment, such as the system 100 of FIG. 1 and/or the computing environment of FIG. 10, may be configured to perform the method 500. For example, the server device 106 of FIG. 1 may be configured to perform the method 500.

At 502, data may be received. The data may be associated with a first voice query. The data may have a first length. The data may be received by a server. At 504, a first processing function of a plurality of processing functions may be determined. The plurality of processing functions may comprise one or more kernels executing on at least one other server. For example, each of the plurality of processing functions may comprise a compute unified device architecture (CUDA) graph. The first processing function may be determined based on the first length of the received data. For example, the first processing function may be configured to process voice queries associated with the first length.

At 506, the data associated with the first voice query may be sent for processing by the first processing function. Processing of the data associated with the first voice query by the first processing function may cause generation of text associated with the first voice query. Sending the data associated with the first voice query for processing by the first processing function may be based on determining that the first processing function is available to process the first voice query. The first processing function may be available to process the first voice query if the first processing function is not currently processing another voice query, such as another voice query associated with the first length.

Two or more voice queries may be associated with data having the same length. For example, data associated with a second voice query may be received. The data associated with the second voice query may have the first length. If the first processing function is processing the first voice query or a different voice query, the first processing function may be unavailable to process the second voice query. If it is determined that the first processing function is unavailable to process the second query, a second processing function of the plurality of processing functions may be determined. The second processing function may be configured to process voice queries of the first length. Data associated with the second query may be sent to the second processing function for processing. For example, the data associated with the second voice query may be sent to the second processing function based on determining that the second processing function is available. Processing of the data associated with the second voice query by the second processing function may cause generation of text associated with the second voice query.

A second voice query may be associated with a different (e.g., second) length. Data associated with a second voice query may be received. The data associated with the second voice query may have the second length. The first processing function may not be configured to process the data associated with the second voice query having the second length. Thus, a second processing function of the plurality of processing functions may be determined. The second processing function may be determined based on the second length. The second processing function may be configured to process voice queries associated with the second length. The data associated with the second voice query may be sent for processing by the second processing function to determine text associated with the second voice query.

A second voice query may be associated with data having a second length. The second length may not correspond to any particular processing function of the plurality of processing functions. A processing function of the plurality of processing functions that most closely corresponds to the second length may be determined. For example, a processing function of the plurality of processing functions that most closely corresponds to the second length may be determined based on none of the plurality of processing functions being configured to process voice queries associated with the second length. The processing function that most closely corresponds to the second length may be determined to be a second processing function of the plurality of processing functions. The second processing function may be configured to process voice queries associated with a third length. The second length may be closer to the third length than to the first length. The second length may be less than the third length. The data associated with the second voice query may be padded (e.g., increased) to have a revised length that corresponds to the third length. The data associated with the second voice query may be sent for processing by the second processing function to determine text associated with the second voice query.

FIG. 6 is an example method 600. The method 600 may comprise a computer implemented method for improving data processing. A system and/or computing environment, such as the system 100 of FIG. 1 and/or the computing environment of FIG. 10, may be configured to perform the method 600. For example, the server device 106 of FIG. 1 may be configured to perform the method 600.

First data may be received, such as by a server. The first data may be associated with a first voice query. At 602, a first length may be determined. The first length may be associated with the first voice query. The first length may be the length of the data associated with the first voice query.

At 604, data associated with the first voice query may be sent for processing by a first processing function of a plurality of processing functions. The plurality of processing functions may comprise one or more kernels executing on at least one other server. For example, each of the plurality of processing functions may comprise a compute unified device architecture (CUDA) graph. The first processing function may be configured to process voice queries associated with the first length. The first processing function may be configured to process the data associated with the first voice query to determine text associated with the first voice query. The first processing function may comprise one or more kernels on the server and configured to process voice queries associated with the first length. The data associated with the first voice query may be sent to the first processing function based on determining that the first processing function is available to execute the first voice query.

Second data may be received. The second data may be associated with a second voice query. At 606, a second length may be determined. The second length may be associated with the second voice query. The second length may be the length of the data associated with the second voice query.

At 608, data associated with the second voice query may be sent for processing by a second processing function of the plurality of processing functions. The second processing function may be configured to process voice queries associated with the second length. The second processing function may be configured to process the data associated with the second voice query to determine text associated with the second voice query. The second processing function may comprise one or more kernels executing on the server and configured to process voice queries associated with the second length. The data associated with the second voice query may be sent to the second processing function based on determining that the second processing function is available to execute the second voice query.

Third data may be received. The third data may be associated with a third voice query. The third data associated with the third voice query may have a third length. The third length may be greater than the second length. The third length may be less than the first length. The third data associated with the third voice query may be padded (e.g., increased) to have a revised length. The revised length may correspond to the first length. The third data associated with the third voice query may be sent for processing by the first processing function to determine text associated with the third voice query.

Third data may be received. The third data may be associated with a third voice query. The third data associated with the third voice query may have a third length. It may be determined that none of the plurality of processing functions are configured to process voice queries associated with the third length. For example, it may be determined that neither the first processing function nor the second processing function is configured to process voice queries associated with the third length. Based on none of the plurality of processing functions being configured to process voice queries associated with the third length, a third processing function of the plurality of processing functions may be determined. The third processing function may be configured to process voice queries associated with a fourth length. The third length may be closer to the fourth length than to the first length and the second length. The third data associated with the third voice query may be padded (e.g., increased) to have a revised length that corresponds to the fourth length. The third data associated with the third voice query may be sent for processing by the third processing function to determine text associated with the third voice query.

FIG. 7 is an example method 700. The method 700 may comprise a computer implemented method for improving data processing. A system and/or computing environment, such as the system 100 of FIG. 1 and/or the computing environment of FIG. 10, may be configured to perform the method 700. For example, the server device 106 of FIG. 1 may be configured to perform the method 700.

A processing function pool may comprise a plurality of processing functions. Each of the plurality of processing functions may comprise, for example, a compute unified device architecture (CUDA) graph. A CUDA graph may comprise a plurality of kernels (e.g., graphics processing unit (GPU) kernels, subroutines, etc.) that are linked together. The plurality of GPU kernels may be launched once as a whole graph of operations, instead of being launched individually (e.g., one at a time). The plurality of processing functions may be pre-prepared (e.g., initialized). The plurality of processing functions may be initialized to process data of a plurality of input lengths. For example, each of the plurality of processing functions may be initialized to process data of a particular length of the plurality of inputs lengths. Initializing each of the plurality of processing functions may comprise recording a sequence of kernels associated with processing an unexecuted query associated with a particular length of the plurality of input lengths.

The plurality of inputs lengths may be determined based on previously executed queries. The previously executed queries may be associated with a rate of arrival. At 702, a rate of arrival may be determined. The rate of arrival may be associated with the executed queries. The executed queries may be associated with a first plurality of lengths. The system may comprise one or more of an automatic speech recognition (ASR) system, a natural language understanding (NLU) system, or a machine translation system. The previously executed queries may be associated with a distribution of lengths. At 704, a distribution may be determined. The distribution may be associated with the first plurality of lengths. For example, the distribution may indicate all of the lengths associated with the executed queries and/or the relative frequency (probability of how often they occur) of each of the lengths.

A second plurality of lengths (e.g., the plurality of input lengths) may be determined based at least on the rate of arrival and the distribution of lengths. At 706, the second plurality of lengths may be determined. The second plurality of lengths may be determined based at least on the rate of arrival and the distribution associated with the first plurality of lengths. For example, if the distribution indicates that none of the executed queries are associated with a particular length, the determined second plurality of lengths may not comprise that length. If the distribution indicates that at least one of the executed queries are associated with a particular length, the determined second plurality of lengths may comprise that length. If the rate of arrival indicates that the executed queries associated with a particular length arrived at the system slowly (e.g., at a low rate), the determined second plurality of lengths may not comprise that length. If the rate of arrival indicates that the executed queries associated with a particular length arrived at the system rapidly (e.g., at a high rate), the determined second plurality of lengths may comprise that length.

The plurality of processing functions may be initialized. At 708, the plurality of processing functions may be initialized. The plurality of processing functions may be initialized based on the second plurality of lengths. Initializing the plurality of processing functions may comprise causing the plurality of processing functions to run on one or more servers. The entire plurality of processing functions may be initialized on one or more servers. For example, the entire plurality of processing functions may be initialized on a first server, and the entire plurality of processing functions may be initialized on a second server, and so on. A subset of the plurality of processing functions may be initialized on one server and another subset of the plurality of processing functions may be initialized on another server, and so on. Each of the plurality of processing functions may be initialized on a different server.

Each length of the second plurality of lengths may correspond to at least one processing function of the plurality of processing functions. For example, if the second plurality of lengths comprises a particular length, at least one processing function of the plurality of processing functions may be initialized to process data of that particular length. More than one processing function of the plurality of processing functions may be initialized to process data of the same length. For example, if the distribution indicated that a large percentage of the executed queries are associated with a particular length, a larger quantity of processing functions may be initialized to process data of that length. Conversely, if the distribution indicated that a small percentage of the executed queries are associated with a particular length, a smaller quantity (e.g., one, two, etc.) of processing functions may be initialized to process data of that length. If the rate of arrival indicates that the executed queries associated with a particular length arrived at the system rapidly, a larger quantity of processing functions may be initialized to process data of that length. Conversely, if the rate of arrival indicates that the executed queries associated with a particular length arrived at the system slowly, a smaller quantity (e.g., one, two, etc.) of processing functions may be initialized to process data of that length.

A first unexecuted query may be received. The first unexecuted query may be received by a server. The first unexecuted query may be associated with a first length of the second plurality of lengths. Data associated with the first unexecuted query may be sent to a first processing function of the plurality of processing functions. The first processing function may be associated with the first length. Based on sending the data associated with the first unexecuted query to the first processing function, output associated with the first unexecuted query may be caused. A second unexecuted query may be received. The second unexecuted query may be received by the server. The second unexecuted query may be associated with a second length of the second plurality of lengths. Data associated with the second unexecuted query may be sent to a second processing function of the plurality of processing functions. The second processing function may be associated with the second length. Based on sending the data associated with the second unexecuted query to the second processing function, output associated with the second unexecuted query may be caused.

FIG. 8 is an example method 800. The method 800 may comprise a computer implemented method for improving data processing. A system and/or computing environment, such as the system 100 of FIG. 1 and/or the computing environment of FIG. 10, may be configured to perform the method 800. For example, the server device 106 of FIG. 1 may be configured to perform the method 800.

At 802, data may be received. The data may be associated with a first voice query. The first voice query may be associated with a first time duration. At 804, a first server of a plurality of servers, may be determined. Each of the plurality of servers may be configured to process voice queries associated with a different time duration. The first server may be configured to process voice queries associated with the first time duration. For example, the at least one processing function may be executing on the first server. The at least one processing function may comprise one or more kernels configured to process voice queries associated with the first time duration. The at least one processing function may comprise, for example, at least one compute unified device architecture (CUDA) graph.

At 806, the data associated with the first voice query may be sent for processing by the first server. Processing of the data associated with the first voice query by the first server may cause generation of text associated with the first voice query. Sending the data associated with the first voice query for processing by the first server may be based on determining that the first server is available to process the first voice query. The first server may be available to process the first voice query if the server is not currently processing another voice query, such as another voice query associated with the first time duration. The first server may be available to process the first voice query if at least one of the processing functions executing on the server is not currently processing another voice query, such as another voice query associated with the first time duration.

A second voice query may be associated with a different (e.g., second) time duration. Data associated with the second voice query may be received. The first server may not be configured to process voice queries associated with the second time duration. Thus, a second server of the plurality of servers may be determined. The second server may be determined based on the second time duration. The second server may be configured to process voice queries associated with the second time duration. The data associated with the second voice query may be sent for processing by the second server to determine text associated with the second voice query.

A second voice query may be associated with a second time duration. The second time duration may not correspond to any particular server of the plurality of servers. A server of the plurality of servers that most closely corresponds to the second time duration may be determined. For example, a server of the plurality of servers that most closely corresponds to the second time duration may be determined based on none of the plurality of servers being configured to process voice queries associated with the second time duration. The server that most closely corresponds to the second time duration may be determined to be a second server of the plurality of servers. The second server may be configured to process voice queries associated with a third time duration. The second time duration may be closer to the third time duration than to the first time duration. The second time duration h may be less than the third time duration. The data associated with the second voice query may be padded (e.g., increased) to have a revised time duration that corresponds to the third time duration. The data associated with the second voice query may be sent for processing by the second server to determine text associated with the second voice query.

Figure 9:
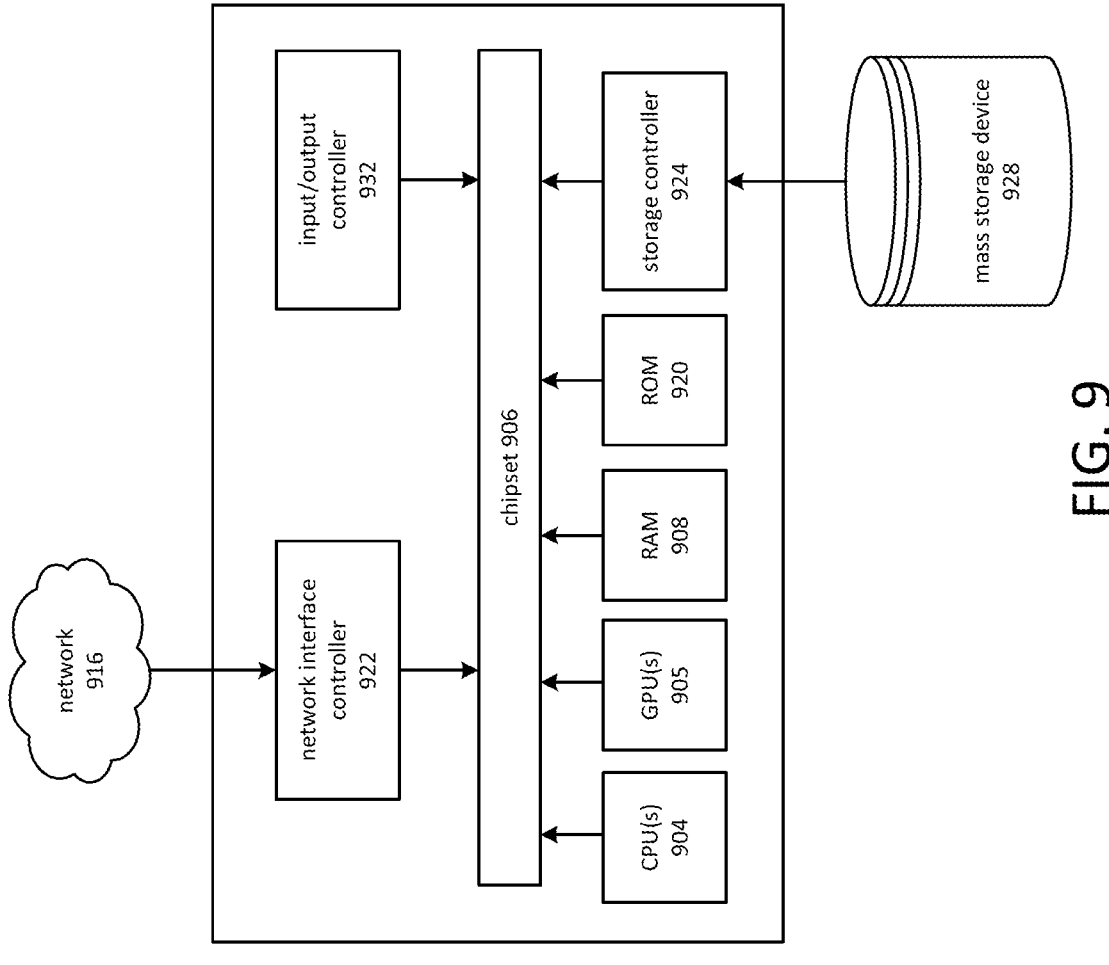
FIG. 9 is a block diagram of an example computing device.

FIG. 9 depicts a computing device that may be used in various aspects, such as the servers and/or devices depicted in FIG. 1. With regard to the example architecture of FIG. 1, the server device 106, the processing function pool 108, and/or the decoder device 110, may each be implemented in an instance of a computing device 900 of FIG. 9.

The computer architecture shown in FIG. 9 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIG. 5, FIG. 6, FIG. 7, and FIG. 8.

The computing device 900 may include a baseboard, or "motherboard," which is a printed circuit board to which a multitude of components or devices may be connected by way of a system bus or other electrical communication paths. One or more central processing units (CPUs) 904 may operate in conjunction with a chipset 906. The CPU(s) 904 may be standard programmable processors that perform arithmetic and logical operations necessary for the operation of the computing device 900.

The CPU(s) 904 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 904 may be augmented with or replaced by other processing units, such as GPU(s) 905. The GPU(s) 905 may comprise processing units specialized for but not necessarily limited to highly parallel computations, such as graphics and other visualization-related processing.

A chipset 906 may provide an interface between the CPU(s) 904 and the remainder of the components and devices on the baseboard. The chipset 906 may provide an interface to a random access memory (RAM) 908 used as the main memory in the computing device 900. The chipset 906 may further provide an interface to a computer-readable storage medium, such as a read-only memory (ROM) 920 or non-volatile RAM (NVRAM) (not shown), for storing basic routines that may help to start up the computing device 900 and to transfer information between the various components and devices. ROM 920 or NVRAM may also store other software components necessary for the operation of the computing device 900 in accordance with the aspects described herein.

The computing device 900 may operate in a networked environment using logical connections to remote computing nodes and computer systems through local area network (LAN) 916. The chipset 906 may include functionality for providing network connectivity through a network interface controller (NIC) 922, such as a gigabit Ethernet adapter. A NIC 922 may be capable of connecting the computing device 900 to other computing nodes over a network 916. It should be appreciated that multiple NICs 922 may be present in the computing device 900, connecting the computing device to other types of networks and remote computer systems.

The computing device 900 may be connected to a mass storage device 928 that provides non-volatile storage for the computer. The mass storage device 928 may store system programs, application programs, other program modules, and data, which have been described in greater detail herein. The mass storage device 928 may be connected to the computing device 900 through a storage controller 924 connected to the chipset 906. The mass storage device 928 may consist of one or more physical storage units. A storage controller 924 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 900 may store data on a mass storage device 928 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 928 is characterized as primary or secondary storage and the like.

For example, the computing device 900 may store information to the mass storage device 928 by issuing instructions through a storage controller 924 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 900 may further read information from the mass storage device 928 by detecting the physical states or characteristics of one or more particular locations within the physical storage units.

In addition to the mass storage device 928 described above, the computing device 800 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 800.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 928 depicted in FIG. 9, may store an operating system utilized to control the operation of the computing device 900. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 928 may store other system or application programs and data utilized by the computing device 900.

The mass storage device 928 or other computer-readable storage media may also be encoded with computer-executable instructions, which, when loaded into the computing device 900, transforms the computing device from a general-purpose computing system into a special-purpose computer capable of implementing the aspects described herein. These computer-executable instructions transform the computing device 900 by specifying how the CPU(s) 904 transition between states, as described above. The computing device 900 may have access to computer-readable storage media storing computer-executable instructions, which, when executed by the computing device 900, may perform the methods described in relation to FIG. 5, FIG. 6, FIG. 7, and FIG. 8.

A computing device, such as the computing device 900 depicted in FIG. 9, may also include an input/output controller 932 for receiving and processing input from a number of input devices, such as a keyboard, a mouse, a touchpad, a touch screen, an electronic stylus, or other type of input device. Similarly, an input/output controller 932 may provide output to a display, such as a computer monitor, a flat-panel display, a digital projector, a printer, a plotter, or other type of output device. It will be appreciated that the computing device 900 may not include all of the components shown in FIG. 9, may include other components that are not explicitly shown in FIG. 9, or may utilize an architecture completely different than that shown in FIG. 9.

As described herein, a computing device may be a physical computing device, such as the computing device 900 of FIG. 9. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described herein with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, or in addition, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method comprising:
receiving data associated with a first voice query, wherein the first voice query has a first time duration;
based on the first time duration falling within a first range of time durations, selecting a first server, of a plurality of servers, configured to process voice queries associated with the first range of time durations, wherein each of the plurality of servers is configured to process voice queries associated with a different range of time durations than other servers of the plurality of servers; and
sending the data associated with the first voice query for speech-to-text processing by the first server to determine text associated with the first voice query.

2. The method of claim 1, wherein at least one processing function is executing on the first server, and wherein the at least one processing function comprises one or more kernels configured to process voice queries associated with the first range of time durations.

3. The method of claim 1, wherein sending the data associated with the first voice query for speech-to-text processing by the first server is based on determining that at least one processing function executing on the first server is available to process the first voice query.

4. The method of claim 1, further comprising:
receiving data associated with a second voice query, wherein the second voice query has a second time duration;
based on the second time duration falling within a second range of time durations, determining a second server, of the plurality of servers, configured to process voice queries associated with the second range of time durations; and
sending the data associated with the second voice query for speech-to-text processing by the second server to determine text associated with the second voice query.

5. The method of claim 1, further comprising:
receiving data associated with a second voice query, wherein the second voice query has a second time duration that falls within the first range of time durations and is less than the first time duration;
padding the data associated with the second voice query to have a revised time duration that is equal to the first time duration; and
sending the data associated with the second voice query for speech-to-text processing by the first server to determine text associated with the second voice query.

6. The method of claim 1, further comprising:
receiving data associated with a second voice query, wherein the second voice query has a second time duration;
based on none of the plurality of servers being configured to process voice queries having the second time duration, determining a second server, of the plurality of servers, configured to process voice queries having a third time duration, wherein the second time duration is less than the third time duration and greater than the first time duration;
padding the data associated with the second voice query to have a revised time duration that is equal to the third time duration; and
sending the data associated with the second voice query for speech-to-text processing by the second server to determine text associated with the second voice query.

7. The method of claim 1, wherein at least one compute unified device architecture (CUDA) graph is executing on the first server, wherein the at least one CUDA graph comprises one or more kernels configured to process voice queries associated with the first range of time durations.

8. A method comprising:
determining, by a server, a first length of a first voice query;
selecting, based on the first length falling within a first range of lengths, a first processing function of a plurality of processing functions configured to process voice queries associated with the first range of lengths;
sending data associated with the first voice query for speech-to-text processing by the first processing function to determine text associated with the first voice query;
determining, by the server, a second length of a second voice query;
selecting, based on the second length falling within a second range of lengths, a second processing function of the plurality of processing functions configured to process voice queries associated with the second range of lengths; and sending data associated with the second voice query for speech-to-text processing by the second processing function to determine text associated with the second voice query.

9. The method of claim 8, wherein the first processing function comprises one or more kernels executing on the server and configured to process voice queries associated with the first range of lengths, and wherein the second processing function comprises one or more kernels executing on the server and configured to process voice queries associated with the second range of lengths.

10. The method of claim 8, further comprising:

receiving data associated with a third voice query, wherein the third voice query has a third length that falls within the first range of time durations, and wherein the third length is greater than the second length and less than the first length;

padding the data associated with the third voice query to have a revised length that is equal to the first length; and sending the data associated with the third voice query for speech-to-text processing by the first processing function to determine text associated with the third voice query.

11. The method of claim 8, further comprising:

receiving data associated with a third voice query, wherein the third voice query has a third length;

based on none of the plurality of processing functions being configured to process voice queries having the third length, selecting a third processing function, of the plurality of processing functions, configured to process voice queries having a fourth length, wherein the third length is less than the fourth length and greater than the first length and the second length;

padding the data associated with the third voice query to have a revised length that is equal to the fourth length; and sending the data associated with the third voice query for speech-to-text processing by the third processing function to determine text associated with the third voice query.

12. The method of claim 8, further comprising:

sending the data associated with the first voice query to the first processing function based on determining that the first processing function is available to execute the first voice query; and sending the data associated with the second voice query to the second processing function based on determining that the second processing function is available to execute the second voice query.

13. The method of claim 8, wherein at least one of the first processing function or the second processing function are executing on at least one other server.

14. The method of claim 8, wherein each of the plurality of processing functions comprises a compute unified device architecture (CUDA) graph.

15. A method comprising:

determining a rate of arrival associated with executed queries, wherein the executed queries are associated with a first plurality of lengths;

determining a distribution associated with the first plurality of lengths;

based at least on the rate of arrival and the distribution associated with the first plurality of lengths, determining a second plurality of lengths; and based on the second plurality of lengths, initializing a plurality of processing functions.

16. The method of claim 15, wherein the rate of arrival indicates a rate at which the executed queries were received at one or more of an automatic speech recognition (ASR) system, a natural language understanding (NLU) system, or a machine translation system.

17. The method of claim 15, wherein initializing the plurality of processing functions comprises:

for each of the plurality of processing functions, recording a sequence of kernels associated with processing an unexecuted query associated with a particular length of the second plurality of lengths.

18. The method of claim 15, wherein initializing the plurality of processing functions comprises causing the plurality of processing functions to run on a plurality of servers.

19. The method of claim 15, further comprising:

receiving, by a server, a first unexecuted query associated with a first length of the second plurality of lengths;

based on sending data associated with the first unexecuted query to a first processing function of the plurality of processing functions, causing output associated with the first unexecuted query, wherein the first processing function is associated with the first length;

receiving, by the server, a second unexecuted query associated with a second length of the second plurality of lengths; and based on sending data associated with the second unexecuted query to a second processing function of the plurality of processing functions, causing output associated with the second unexecuted query, wherein the second processing function is associated with the second length.

20. The method of claim 15, wherein each of the plurality of processing functions comprises a compute unified device architecture (CUDA) graph.

21. The method of claim 15, further comprising:

receiving data associated with a first unexecuted query, wherein the first unexecuted query has a first length of the second plurality of lengths;

based on the first length, selecting a first processing function of the plurality of processing functions, configured to process unexecuted queries having the first length; and sending the data associated with the first unexecuted query for processing by the first server to cause output associated with the first unexecuted query.

* * * * *